United States Patent
Hoefler

(10) Patent No.: US 7,056,449 B2
(45) Date of Patent: Jun. 6, 2006

(54) AQUEOUS SILICA DISPERSION

(75) Inventor: Joseph Michael Hoefler, Bensalem, PA (US)

(73) Assignee: Rohm and Haas Company, Philadelphia, PA (US)

( * ) Notice: Subject to any disclaimer, the term of this patent is extended or adjusted under 35 U.S.C. 154(b) by 346 days.

(21) Appl. No.: 10/634,088

(22) Filed: Aug. 4, 2003

(65) Prior Publication Data

US 2004/0034123 A1     Feb. 19, 2004

Related U.S. Application Data

(60) Provisional application No. 60/403,518, filed on Aug. 14, 2002.

(51) Int. Cl.
*C14C 11/00*     (2006.01)

(52) U.S. Cl. ................ 252/8.57; 523/213; 524/188

(58) Field of Classification Search ............... None
See application file for complete search history.

(56) References Cited

U.S. PATENT DOCUMENTS

| | | |
|---|---|---|
| 2,577,485 A | 12/1951 | Rule |
| 2,984,629 A | 5/1961 | Loftman et al. |
| 3,290,165 A | 12/1966 | Iannicelli |
| 3,649,582 A | 3/1972 | Wesp |
| 3,686,113 A | 8/1972 | Burke |
| 4,330,446 A * | 5/1982 | Miyosawa .............. 523/409 |
| 4,763,051 A | 8/1988 | Ruppert |
| 4,927,749 A * | 5/1990 | Dorn ...................... 435/2 |
| 5,385,960 A | 1/1995 | Emmons et al. |
| 5,532,307 A * | 7/1996 | Bogan, Jr. ............. 524/407 |
| 5,663,224 A | 9/1997 | Emmons et al. |
| 5,719,206 A * | 2/1998 | Mihoya et al. .......... 432/122 |
| 5,763,388 A | 6/1998 | Lightsey et al. |
| 5,856,379 A | 1/1999 | Shiratsuchi et al. |
| 5,889,090 A | 3/1999 | Tooley et al. |
| 5,985,953 A | 11/1999 | Lightsey et al. |
| 6,323,260 B1 | 11/2001 | Koski et al. |
| 2004/0097600 A1 * | 5/2004 | Greenwood et al. ........ 516/86 |

FOREIGN PATENT DOCUMENTS

| | | |
|---|---|---|
| EP | 0 849 320 A1 | 6/1998 |
| JP | 53011989 A * | 2/1978 |

OTHER PUBLICATIONS

JPO abstract for JP 53-11989A (Miyosawa, Y.) Feb. 2, 1978.*

Jae-Hyun So, et al, Microstructure and rheological behaviour of electrosterically stabilized silica particle suspensions, Colloids and Surfaces 190 (2001) 89-98.

* cited by examiner

*Primary Examiner*—Matthew A. Thexton
(74) *Attorney, Agent, or Firm*—Kim R. Jessum; Gary D. Greenblatt

(57) ABSTRACT

An aqueous silica dispersion containing silica particles dispersed in an aqueous medium is provided. The surfaces of the silica particles are treated with reacted aminosilane compound. The aqueous silica dispersion also contains anionic polymeric dispersing agent. The dispersion of the silica particles into an aqueous medium containing both anionic polymeric dispersing agent and aminosilane compound allows the preparation of aqueous silica dispersions at higher solids and/or low viscosities than aqueous silica dispersions that are prepared without either the anionic polymeric dispersing agent or the aminosilane compound. The aqueous silica dispersion is combinable with aqueous emulsion polymers to modify the physical or appearance properties of articles formed from the emulsion polymer.

5 Claims, No Drawings

AQUEOUS SILICA DISPERSION

CROSS REFERENCE TO RELATED PATENT APPLICATIONS

This is a non-provisional application of prior pending U.S. provisional application Ser. No. 60/403,518 filed Aug. 14, 2002.

This invention relates to an aqueous dispersion containing silica particles dispersed in an aqueous medium. More specifically, the invention relates to an aqueous silica dispersion containing anionic polymeric dispersing agent and having silica particles treated with an aminosilane compound. Also provided is a method of preparing the aqueous silica dispersion and a method of using the aqueous silica dispersion. The aqueous silica dispersion of this invention, which has improved stability and a viscosity that permits easy handling and application to substrates, is useful in the treatment of tanned leather.

Silica is used to modify the physical properties or the appearance of articles prepared from polymer formulations. Applications of silica in polymer formulations include use as a reinforcing agent to increase the strength and toughness of a base polymer, as a filler to reduce the overall cost of a polymer formulation without adversely affecting the desired properties of the base polymer, as an additive to improve the abrasion resistance of surfaces, and as a flattening agent to reduce the surface gloss of an article.

The polymer formulation, which contains the silica as uniformly distributed particles, is prepared by processes that incorporate and disperse the silica particles into the polymer formulation. Polymer formulations based on emulsion polymers are commonly prepared by employing wet blending techniques such as preparing the silica particles as an aqueous silica particle dispersion and then admixing the aqueous silica particle dispersion with an emulsion polymer. Typically, the hydrophilic silica particles are surface treated to improve dispersibility, aqueous stability, or the ability to mix with an emulsion polymer.

U.S. Pat. No. 5,763,388 discloses a process for the incorporation of silica into a polymer in latex form. The disclosed process includes treating the silica with an organo silicon compound coupling agent in aqueous suspension to form a compatibilized silica. The polymer latex is then contacted with the compatibilized silica to uniformly distribute the silica throughout the latex. Disclosed examples of the organo silicon compound coupling agent includes aminosilane compounds.

Despite this disclosure, a method is desired to provide aqueous silica dispersions having a combination of high solids and low viscosity, such dispersions being suitable for the preparation of silica containing polymer formulations. Further, it is desired that the aqueous silica dispersions have good storage stability especially when formulated with polymer particles to form coating compositions. Settling of the silica particles from the dispersion or increases in viscosity of the dispersion upon storage indicate poor storage stability.

The inventor has surprisingly discovered an aqueous silica dispersion that can be prepared at high solids while maintaining a low viscosity to facilitate handling. Further, this aqueous silica dispersion has improved storage stability and is readily combinable with aqueous polymer dispersions to provide silica modified polymer formulations suitable for a wide variety of applications.

According to the first aspect of the present invention, an aqueous silica dispersion is provided containing from 1 to 30 weight % silica particles having a surface, based on weight of the aqueous silica dispersion; from 0.01 to 10 weight % reacted aminosilane compound attached to the surface of the silica particles, based on weight of the silica particles; from 5 to 25 weight % anionic polymeric dispersing agent, based on weight of the silica particles; and an aqueous medium; wherein the silica particles are dispersed in the aqueous medium.

A second aspect of the present invention provides a process for preparing an aqueous silica dispersion containing silica particles dispersed in an aqueous medium, including the steps of: providing the aqueous medium; admixing anionic polymeric dispersing agent and aminosilane compound into the aqueous medium; admixing the silica particles into the aqueous medium containing the anionic polymeric dispersing agent and the aminosilane compound; and reacting or allowing to react the aminosilane compound with the silica particles to provide the aqueous silica dispersion.

A third aspect of the present invention provides a method for treating tanned leather, including the steps of: contacting the tanned leather with an aqueous silica dispersion containing silica particles having a surface, from 0.01 to 10 weight % reacted aminosilane compound attached to the surface of the silica particles, based on weight of the silica particles, from 5 to 25 weight % anionic polymeric dispersing agent, based on weight of the silica particles, polymer particles, and an aqueous medium, wherein the silica particles and the polymer particles are dispersed in the aqueous medium; and drying or allowing to dry the aqueous silica dispersion that is contacted with the tanned leather.

As used herein, the use of the term "(meth)" followed by another term such as acrylate refers to both acrylates and methacrylates. For example, the term "(meth)acrylate" refers to either acrylate or methacrylate and the term "(meth) acrylic" refers to either acrylic or methacrylic.

The aqueous silica dispersion of this invention contains silica particles dispersed in an aqueous medium. The surfaces of the silica particles are treated with reacted aminosilane compound. Further, the aqueous silica dispersion contains anionic polymeric dispersing agent. The dispersion of the silica particles into an aqueous medium containing both the anionic polymeric dispersing agent and the aminosilane compounds allows the preparation of aqueous silica dispersions at higher solids and/or low viscosities than aqueous silica dispersions that are prepared without either the anionic polymeric dispersing agent or the aminosilane compound.

The aqueous silica dispersion is prepared by providing an aqueous medium, and admixing an anionic polymeric dispersing agent and an aminosilane compound into the aqueous medium. Next, silica particles are admixed into the aqueous medium containing the anionic polymeric dispersing agent and the aminosilane compound. The aminosilane reacts or is allowed to react with the surface of the silica particles to provide the aqueous silica dispersion of this invention.

The silica particles contained in the composition of this invention are particles of amorphous silica. Sources of amorphous silica includes silicas prepared by liquid phase processes such as precipitated silicas, colloidal silicas, and silica gels, as well as silicas prepared by vapor phase processes such as fumed silicas and pyrogenic silicas. Suitable silica particles include silicas having untreated surfaces and silicas having treated surfaces; and include particle surfaces having a hydrophilic nature and particle surfaces having a hydrophobic nature. Average particle diameters of the silica particles are typically in the range of from 1 nm to 100 microns, preferably in the range of from 10 nm to 20 microns, and more preferably in the range of from 100 nm to 10 microns.

The choice of silica particle type and size is determined largely by the intended application of the aqueous silica dispersion.

In one embodiment, the silica particles are used as flattening agents to lower the surface gloss of coatings. In this embodiment, the silica particles have an average particle diameter in the range of from 1 micron to 10 microns, preferably in the range of 1.5 microns to 8 microns. Preferably, these silica particles are fumed silica either without surface treatment or with a surface treatment such as paraffin wax. Alternatively, these silica particles are silica gel particles.

In another embodiment, the silica particles are used as fillers in polymers. These silica particles generally have an average particle diameter in the range of from 1 micron to 100 microns. Suitable silicas include silica gel particles, preferably with a surface treated with an organic material such as paraffin.

The silica particles are also, useful as reinforcing agents in polymers, intended to increase the modulus or strength of the polymer or to increase the abrasion resistance of the polymer surface. In this application, suitable silica particles include particles having average diameters of 10 nm to 1 micron. The surfaces of the silica particles are optionally treated.

A suitable range for the amount of silica particles in the aqueous silica dispersion is 1 to 30 weight %, based on the weight of the aqueous silica dispersion. Higher levels of silica particles solids are usually preferred to maximize production output and minimize the transport of water. Preferably, the aqueous silica dispersion contains at least 2 weight % and more preferably at least 5 weight %. The upper limit for the amount of the silica particles in the aqueous silica dispersion is usually determined by the constraint to maintain a viscosity suitable for production, handling, and formulation of the aqueous silica dispersion. This high solids level is dependent upon factors such as the average particle diameter, the shape, and the type of the silica particles, parameters that affect the viscosity of the aqueous silica dispersion. A suitable solids range for fumed silica particles having an average diameter of 1 micron to 20 microns is 1 to 12 weight % solids and preferably 4 to 8 weight % solids, based on the weight of the aqueous silica dispersion.

Preferred are aqueous silica dispersions having a viscosity of 2 Pa-s or less, preferably 1 Pa-s or less, and more preferably 0.5 Pa-s or less, to enable facile handling and formulation. The viscosity is measured with a Brookfield™ LVTD viscometer (Brookfield Engineering Co.) at 60 rpm.

The aqueous medium is the continuous liquid phase of the aqueous silica dispersion. The aqueous medium contains water and optionally, one or more water miscible solvents. Suitable water miscible solvents include methanol, ethanol, propanol, acetone, ethylene glycol ethyl ethers, propylene glycol propyl ethers, and diacetone alcohol. Preferably, the aqueous medium contains greater than 90 weight % water, and more preferably, greater than 95 weight % water, and most preferably, greater than 98 weight % water, based on the weight of the aqueous medium. The aqueous medium containing from 98 to 100 weight % water, based on the weight of the aqueous medium, is referred to herein as "substantially free of solvent". The aqueous medium has a pH of 6 and greater, preferably 7 and greater, and more preferably, 8 and greater. A suitable upper limit to the pH is 13, preferably 12, and more preferably, 11. A base or an acid is optionally added to adjust the pH of the aqueous medium to a suitable range. One source of solvent in the aqueous medium is alcohol such as methanol and ethanol that are generated from the hydrolysis of aminosilane compounds having silicon ester moieties.

The aminosilane compounds useful in the preparation of the aqueous silica dispersion have an amine functionality and at least silane moiety. The silane moiety contains either a silanol group or has a reactive group that is capable of forming a silanol group. Examples of suitable reactive groups for the silane moieties includes ester groups (—OR) and acyloxy groups (—OC(O)R, wherein R is an alkyl or alkylaryl group. The silane moiety is represented by the structure:

—Si(OR")$_{3-n}$(R')$_n$ wherein n is an integer having a value of 0, 1, or 2; OR" is —OH, or an ester or acyloxy group having a linear or branched alkyl group; and R' is a linear or branched alkyl group or alkylaryl group. In the presence of moisture, the ester or acyloxy group hydrolyzes to form a silanol group. The silane moiety is trifunctional for n=0, difunctional for n=1, and monofunctional for n=2. The difunctional and trifunctional silane moieties are either partly or completely hydrolyzed in the presence of moisture.

One class of suitable aminosilane compounds is described by Formula (I):

$$R_1R_2N—R_3—Si(OR_4)_{3-n}(R_5)_n \qquad (I)$$

wherein n is an integer having a value of 0, 1, or 2. $R_1$ and $R_2$ are independently chosen from H, linear or branched alkyl groups or alkylaryl groups. $R_3$ is an alkenyl group, such as —(CH$_2$)$_n$—, wherein n is an integer having a value in the range of 1 to 6. The group OR$_4$ is an ester group or an acyloxy group. $R_5$ is chosen from linear or branched alkyl groups or alkylaryl groups. Examples of suitable ester groups include methoxy, ethoxy, and propoxy groups. An example of an acryloxy group is an acetoxy group. Alternatively, the aminosilane compound is provided prehydrolyzed, containing one or more silanol groups.

A second class of suitable aminosilane compounds include diamine organosilanes characterized by Formula II:

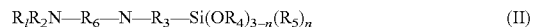

$$R_1R_2N—R_6—N—R_3—Si(OR_4)_{3-n}(R_5)_n \qquad (II)$$

wherein n, $R_1$, $R_2$, $R_3$, and $R_4$ are defined above in Formula I and $R_6$ is an alkenyl group.

Other suitable aminosilane compounds include aminosilane compounds containing more than one silane moiety, such as aminosilanes characterized by Formula III

$$R_1R_2N(R_3—Si(OR_4)_{3-n}(R_5)_n)_2 \qquad (III)$$

wherein n, $R_1$, $R_2$, $R_3$, $R_4$, and $R_5$ are defined above in Formula I.

Examples of suitable aminosilane compounds include aminopropyl trimethoxysilane, aminopropyl methyldimethoxysilane, aminopropyl dimethylmethoxysilane, aminopropyl triethoxysilane, N-(2-aminoethyl)-3-aminopropyl trimethoxysilane, N-(2-aminoethyl)-3-aminopropyl methyldimethoxysilane, (aminoethylaminomethyl)phenylethyl trimethoxysilane, 4-aminobutyl dimethylmethoxysilane, 4-aminobutyl triethoxysilane, N-2-aminoethyl-3-aminopropyl tris(2-ethylhexoxy)silane, 3-aminopropyl dimethylethoxysilane, 3-aminopropyl methyldiethoxysilane, and mixtures thereof.

The aminosilane compound is added directly to the aqueous medium, either prior to, concurrent with, or after the addition of the anionic polymeric dispersing agent. Alternatively, the aminosilane compound is hydrolyzed prior to addition to the aqueous medium. An aqueous medium having a pH above 7 facilitates hydrolysis of the acyloxy or ester group to form silanol.

In the presence of the silica particles, the silanol groups of the partly or completely hydrolyzed aminosilane compound are chemically reactive with the surface of the silica particles. The reaction results in the formation of at least one siloxane bond (Si—O—Si) between the reacted aminosilane compound and the surface of the silica particles. One or more bonds are formed between the aminosilane compound and the silica particle surface, depending upon the degree of functionality of the aminosilane compound. A difunctional aminosilane forms one or two bonds with the silica particle surface, while a trifunctional aminosilane forms one, two, or three bonds with the silica surface. The extent of bond formation depends on several factors include the pH of the aqueous phase and the temperature.

The composition of this invention contains from 0.01 to 10 weight % of the reacted aminosilane compound, based on the weight of the silica particles. Preferably, the aqueous silica dispersion contains at least 1, and more preferably at least 2 weight % reacted aminosilane compound, based on the weight of the silica particles. Preferably, the aqueous silica dispersion contains 9 weight % or less, and more preferably 8 weight % or less reacted aminosilane compound, based on the weight of the silica particles. As used herein, the term "weight % reacted aminosilane compound" refers to the weight % of the fully hydrolyzed aminosilane compound without the hydrogen atoms of the silanol groups. For example, the structure of the reacted aminosilane compound corresponding to aminopropyl (trimethoxy)silane is $H_2N—(CH_2)_3—Si(O—)_3$.

The aqueous silica dispersion also contains an anionic polymeric dispersing agent. The anionic polymeric dispersing agent is an addition polymer or a condensation polymer having acid groups or salts thereof, pendant to the backbone of the polymer. Addition polymers suitable as the anionic polymeric dispersing agent contain as polymerized units, at least one ethylenically unsaturated acid containing monomer and optionally at least one ethylenically unsaturated nonionic monomer. Suitable acid monomers include monomers having carboxylic acid groups such as acrylic acid, methacrylic acid, itaconic acid, fumaric acid, crotonic acid, maleic acid, monomethyl itaconate, monomethyl fumarate, and monobutyl fumarate; anhydrides such as maleic anhydride and itaconic anhydride; or combinations thereof. Ethylenically unsaturated nonionic monomers are monomers that do not have an ionic charge at a pH in the range of from 2 to 13. Suitable ethylenically unsaturated monomers include alkyl esters of (meth)acrylic acid such as ethyl acrylate, butyl acrylate, and methyl methacrylate, hydroxy esters of (meth)acrylic acid such as hydroxyethyl methacrylate, hydroxyethyl acrylate, hydroxypropyl acrylate, and hydroxypropyl methacrylate; aromatic monomers such as styrene and a-methyl styrene; and alkenes such as diisobutylene. The anionic polymeric dispersing agent contains greater than 50 weight %, preferably at least 70 weight %, and more preferably at least 85 weight % ethylenically unsaturated acid monomer as polymerized units, based on the weight of the anionic polymeric dispersing agent. The anionic polymeric dispersing agent contains from 0 to less than 50 weight %, preferably 0 to 30 weight %, and more preferably from 0 to 15 weight % ethylenically unsaturated nonionic monomer, based on the weight of the anionic polymeric dispersing agent. Other polymers suitable as the anionic polymeric dispersion agent include naphthalenesulfonic acid condensates and salts thereof. Examples of the anionic polymeric dispersing agent are polyacrylic acid polymers and polymers described in U.S. Pat. No. 2,901,453.

The anionic polymeric dispersing agent is further characterized as having a weight average molecular weight in the range of from 1,000 to 50,000, preferably in the range of from 2,000 to 40,000, and most preferably, in the range of from 2,500 to 25,000. The weight average molecular weight is determined by gel permeation chromatography.

The aqueous silica dispersion contains from 5 to 25 weight % anionic polymeric dispersing agent, based on the weight of the silica particles. Preferably, the aqueous silica dispersion contains at least 7 weight % and more preferably, at least 10 weight % anionic polymeric dispersing agent, based on the weight of the aqueous silica dispersion. Preferably, the aqueous silica dispersion contains 20 weight % or less and more preferably, 16 weight % and less, anionic polymeric dispersing agent, based on the weight of the aqueous silica dispersion.

The anionic polymeric dispersing agent is typically provided as a partially or completely neutralized polymer, solubilized in an aqueous solution. In the partially or completely neutralized form, the anionic polymeric dispersing agent contains the pendant acid groups as salts, such as ammonium, sodium, and potassium salts of the pendant acid groups. The aqueous solution containing neutralized anionic polymeric dispersing agent has a pH above the $PK_a$ of the pendant acid groups. The pH range for the aqueous solution containing the neutralized polymer is typically in the range of from 7 to 10. Alternatively, the solubilized polymer is provided unneutralized and is partially or completely neutralized either prior to addition the aqueous medium of the aqueous silica dispersion or after addition to the aqueous medium, but prior to the addition of the silica particles.

The aqueous silica dispersion is prepared by providing the aqueous medium, and then admixing the anionic polymeric dispersing agent and the aminosilane compound into the aqueous medium. The anionic polymeric dispersing agent or the solution containing the anionic polymeric dispersion agent is added prior to, during, or after the addition of the aminosilane compound. The aminosilane compound is added neat or diluted in water or solvent. The aminosilane compound is optionally prehydrolyzed prior to addition into the aqueous medium by preparing a dilute solution of the aminosilane in water or a mixture of water and a solvent such as an alcohol. Preferably, mixing is employed to decrease the time required to minimize localized concentrations and distribute the anionic polymer dispersing agent or the aminosilane compound in the aqueous medium. The pH of the aqueous medium is optionally adjusted by the addition of acid or base. The optional acid or base is added at any time prior to, during, or after the addition of the anionic polymeric dispersing agent or the aminosilane compound. The aqueous medium containing the aminosilane compound and the anionic polymeric dispersing agent preferably has a pH in the range of from 7 to 10.

In the next step in the preparation of the aqueous silica dispersion, the silica particles are admixed into the aqueous medium containing the anionic polymeric dispersing agent and the aminosilane. High shear mixing is generally used to disperse the silica particles in the aqueous medium. Suitable high shear mixing equipment include high shear disk dispersers. Preferably, the silica particles are added gradually with mixing to prevent the formation of large agglomerates of silica particles. The time required to disperse the silica particles in the aqueous medium depends upon various factors including the type of silica, the types and concentrations of the aminosilane compound and the anionic polymeric dispersing agent, the final levels of silica particle solids, and the mixing conditions such as shear rate. Typical mixing times are from one minute to several hours.

In the presence of the aminosilane compound or the hydrolyzed aminosilane compound, which has at least one silanol group, the silica particles undergo reaction to chemically bond the reacted aminosilane compound with the surface of the silica particle. The reaction of the aminosilane compound or the hydrolyzed aminosilane compound results in the formation of a siloxane bond (Si—O—Si) with the silica surface. This reaction typically occurs concurrently upon or after the addition of the silica particles to the aqueous medium containing the aminosilane compound or the hydrolyzed aminosilane compound, and the anionic dispersant. The time required for complete reaction of the aminosilane compound or the hydrolyzed aminosilane compound with the surface of the silica particles varies according to many factors such as the surface area of the silica particles, the pH of the aqueous medium, and mixing conditions. Typically, a majority of the aminosilane compound or hydrolyzed aminosilane compound reacts during the mixing and dispersion of the silica particles into the aqueous medium, although reaction of unreacted aminosilane compound or hydrolyzed aminosilane compound may continue for periods of several hours or longer. Techniques such as $^{29}Si$ NMR are useful for determining the extent of reaction of the aminosilane compound or hydrolyzed aminosilane compound with the silica particle surface, as described in U.S. Pat. No. 5,985,953.

The aqueous silica dispersion optionally includes polymer particles, such as particles of polyurethane polymers, vinyl acetate polymers, styrene butadiene polymers, acrylic and methacrylic polymers, vinyl chloride polymers, and vinylidene chloride polymers. The polymer particles typically have average particle diameters in the range of 10 nm to 10 microns, preferably in the range of 60 nm to 500 nm, and more preferably, in the range of 80 nm to 350 nm. The glass transition temperatures of the polymer particles vary widely according to the intended application of the aqueous silica dispersion. For example, polymer particles having glass transition temperatures in the range of from −20° C. to 40° C. are useful as binders. The polymer particles are commonly provided as aqueous dispersions and are added to the aqueous silica dispersion during the mixing or the dispersion of the silica particles. Alternatively, the aqueous polymer particles dispersion is mixed with the prior formed aqueous silica dispersion.

In one embodiment, the aqueous silica dispersion contains from 1 to 10 weight % silica particles and from 1 to 25 weight % polymer particles, based on the weight of the aqueous silica dispersion. Preferably, the aqueous silica dispersion of this embodiment contains from 2 to 20 weight % polymer particles and more preferably from 4 to 16 weight % polymer particles, based on the weight of the aqueous silica dispersion. Further, polyurethane polymer particles and (meth)acrylate polymer particles are preferred.

The aqueous silica dispersion of this invention is useful for treating tanned leather, such as the application of a nongloss or dull finish. Tanned leather is an animal hide or skin that has been preserved by treatment with a tanning agent, such as a salt of chrome, aluminum, zirconium, titanium, iron, or magnesium; or a suitable vegetable extract. The aqueous silica dispersion is applied onto the tanned leather by various methods such as spraying, roll coating, and hand swabbing. After contacting the aqueous silica dispersion with the leather, the treated leather is dried or allowed to dry.

In one embodiment, the aqueous silica dispersion is employed as a dulling composition for lowering the surface gloss of a substrate. In this embodiment, the aqueous silica dispersion contains fumed silica particles having an average particle diameter in the range of from 1 to 10 microns and polymer particles. The aqueous silica dispersion is blended with an aqueous composition containing polymer particles to form an aqueous formulation. The aqueous formulation is useful for lowering the surface gloss of a substrate, or for preparing a low gloss coating on a substrate. Suitable substrates include wood, plastics, cellulosic materials such as paper and paperboard, metals, cementitious materials, leather, and ceramics.

In addition, the aqueous silica dispersion of this invention optionally includes other components, including without limitation, other polymer particles, surfactants, pigments, extenders, dyes, pearlescents, adhesion promoters, crosslinkers, other dispersants, defoamers, wetting agents, optical brighteners, ultraviolet stabilizers, coalescents, rheology modifiers, preservatives, biocides, and antioxidants.

The examples which follow illustrate certain aspects of the composition and the process of this invention. These examples are intended to aid those skilled in the art in understanding the present invention. The present invention is, however, in no way limited thereby.

The abbreviations "g" represents "grams", and "Pa-s" represents "Pascal-seconds".

EXAMPLE 1

Preparation of the Aqueous Silica Dispersion and Comparative Aqueous Silica Dispersions The aqueous silica dispersion, Example 1, was prepared using anionic polymeric dispersing agent and 3-aminopropyl methyldiethoxysilane as the aminosilane compound. A comparative aqueous silica dispersion, Comparative A, was prepared containing the anionic polymeric dispersing agent but without the addition of the aminosilane. The aqueous silica dispersion and the comparative silica dispersion were prepared by combining the ingredients in the order listed in Table 1 using a high shear dispersator. The silica particles had an average diameter of 4 microns. The viscosities of the samples were measured 20 minutes after preparation to allow time for removal of entrapped air from the samples. The viscosities were measured using a Brookfield™ LVTD viscometer (Brookfield Engineering Co., MA) at 60 rpm.

TABLE 1

Aqueous Silica Dispersion and Comparative Aqueous Silica Dispersion

| Ingredient | Example 1 | Comparative A |
| --- | --- | --- |
| water | 489.2 g | 492.0 g |
| anionic polymeric dispersing agent (25 wt. %) | 40.0 g | 40.0 g |
| 3-aminopropyl methyldiethoxysilane | 2.8 g | — |
| silica particles | 62.0 g | 62.0 g |
| defoamer | 1.0 g | 1.0 g |

TABLE 1-continued

Aqueous Silica Dispersion and Comparative Aqueous Silica Dispersion

| Ingredient | Example 1 | Comparative A |
|---|---|---|
| weight % solids | 12.1 | 12.1 |
| viscosity (Pa-s) | 0.75 | 8.0/2.4 | anionic polymeric dispersing agent: Tamol ™ 731 polymer (Rohm and Haas Company)—sodium salt of a carboxylic acid containing polymer.
silica particles: Acematt ™ TS-100 silica (Degussa AG, Germany);
defoamer: Surfynol ™ 104BC defoamer (Air Products and Chemicals, Inc.)

The results in Table 1 show that the aqueous silica dispersion of this invention, as exemplified by Example 1, had a lower viscosity than the comparative aqueous silica dispersion. Further, the comparative aqueous silica dispersion, Comparative A, had thixotropic viscosity behavior. The viscosity for Comparative A was initially 8.0 Pa-s, which decreased to a viscosity of 2.4 Pa-s, as a result of the stirring by the viscometer spindle. In contrast, the aqueous silica dispersion of Example 1 did not have thixotropic behavior.

EXAMPLE 2

Preparation of the Aqueous Silica Dispersion and Comparative Aqueous Silica Dispersions An aqueous silica dispersion, Example 2, was prepared using anionic polymeric dispersing agent and aminoethyl aminopropyl trimethoxysilane as the aminosilane compound. A comparative aqueous silica dispersion, Comparative B, was prepared containing anionic polymeric dispersing agent but without the addition of the aminosilane compound. The preparation of a second comparative aqueous silica Comparative C, was attempted using aminosilane compound but without the addition of the anionic polymeric dispersing agent. The ingredients used to prepare Example 2 and Comparative Examples B and C, listed in Table 2.1, were admixed using high shear mixing. In the preparation of Comparative C, the mixture exhibited thixotropic flow prior to the complete addition of the silica particles (only 55 g of the intended 62 g was added) and the polymer particles (only 341.5 g of the intended 385 g was added). Comparative C could not be prepared at the same level of solids as Example 2 and Comparative B. Further, Comparative C was observed to undergo rapid sedimentation to form a hard pack layer of silica. The hard pack layer was not redispersible with mixing.

TABLE 1.1

Ingredients for the Preparation of Example 2, Comparative B, and Comparative C

| Ingredient | Example 2 | Comparative B | Comparative C |
|---|---|---|---|
| water | 482 g | 492 g | 532 g |
| anionic polymeric dispersing agent | 40 g | 40 g | — |
| aminoethyl aminopropyl trimethoxysilane (27 weight %) | 12 g | — | 10 g |
| silica particles | 62 g | 62 g | 55 g |
| defoamer | 1 g | 1 g | 1 g |

TABLE 1.1-continued

Ingredients for the Preparation of Example 2, Comparative B, and Comparative C

| Ingredient | Example 2 | Comparative B | Comparative C |
|---|---|---|---|
| polymer particles (40 wt. %) | 385 g | 385 g | 341.5 g |
| wetting agent | 20 g | 20 g | 20 g |
| pH | 9.1 | 8.21 | 8.6 |
| weight % solids | 24.3 | 24.1 | 22.1 | anionic polymeric dispersing agent: Tamol ™ 731A dispersant
silica particles: Acematt ™ TS-100 silica
defoamer: Surfynol ™ 104BC defoamer
wetting agent: Tergitol ™ 15-S-5 wetting agent (Union Carbide Corp, CT).
polymer particles: Primal ™ U-61 polyurethane polymer particle dispersion (Rohm and Haas Company)

The stabilities of the aqueous silica dispersion, Example 2, and the comparative aqueous silica dispersion, Comparative B, were characterized by measuring their viscosities prior to, during, and after heat aging of the samples. A sample having a smaller increase in viscosity over the period of the heat age study were considered to have better stability than a sample having a larger viscosity increase.

The samples were heat aged at 60° C. (140° F.) for ten days. The viscosities were measured with a Brookfield™ LVTD viscometer (Brookfield Engineering Laboratories, Inc., MA), using the #2 and #3 spindles. Two viscosity values are reported for the measurements during the heat aging study. The first reported viscosity value is the initial viscosity of the sample prior to mixing of the sample. The second reported viscosity value is the final viscosity of the sample after mixing of the sample by the spindle of the viscometer.

TABLE 2.2

Viscosities of Example 2 and Comparative B

| Time | | Example 2 | Comparative B |
|---|---|---|---|
| Initial viscosity | (#2) | 0.190 Pa-s | 0.180 Pa-s |
| 12 hrs | (#2) | 0.280/0.230 Pa-s | 0.425/0.330 Pa-s |
| 3 days | (#3) | 0.370/0.320 Pa-s | 0.866/0.660 Pa-s |
| | (#2) | 0.260/0.220 Pa-s | off scale |
| 7 days | (#3) | — | 1.00/0.800 Pa-s |
| | (#2) | 0.375/0.300 Pa-s | off scale |
| 10 days | (#3) | — | 1.100/0.800 Pa-s |
| | (#2) | 0.500/0.400 Pa-s | off scale |

The results show that the aqueous silica dispersion of Example 2, which was prepared with the combination of aminosilane compound and anionic polymeric dispersing agent, had a smaller increase in viscosity both during and after 10 days of heat aging than the comparative aqueous silica dispersion of Comparative B, which was prepared with anionic polymeric dispersing agent. The comparative aqueous silica dispersion of Comparative C, which was prepared with the aminosilane compound, had poor stability as evidenced by the inability to disperse the silica particles at the same level of solids as Example 2 and by the subsequent sedimentation of the silica particles to form a hard pack layer. The viscosity measurements indicate that Example 2, an aqueous silica dispersion of this invention, has improved stability compared to the comparative aqueous silica dispersions prepared either with anionic dispersant or with aminosilane compound.

EXAMPLE 3

Preparation of Aqueous Silica Dispersions Using Various Aminosilane Compounds Aqueous silica dispersions were prepared using anionic polymeric dispersing agent and various aminosilane compounds, including trifunctional and difunctional aminosilane compounds, according to the list of ingredients in Table 3.1.

TABLE 3.1a

| Ingredient | Example 3.1 | Example 3.2 | Example 3.3 |
|---|---|---|---|
| water | 489.0 g | 486.7 g | 488.6 g |
| anionic polymeric dispersing agent | 40.0 g | 40.0 g | 40.0 g |
| 3-aminopropyl methyldiethoxysilane | 3.0 g | — | — |
| bis(trimethoxysilyl-propyl) amine | — | 5.3 g | — |
| γ-aminopropyl triethoxysilane | — | — | 3.5 g |
| silica particles | 62.0 g | 62.0 g | 62.0 g |
| defoamer | 1.0 g | 1.0 g | 1.0 g |
| polymer particles | 385.0 g | 385.0 g | 385.0 g |
| wetting agent | 20.0 g | 20.0 g | 20.0 g |
| pH | 9.1 | 8.9 | 9.0 |
| weight % solids | 24.3 | 24.6 | 24.5 |
| viscosity (Pa-s) | 0.075 | 0.050 | 0.215 |

TABLE 3.1b

| Ingredient | Example 3.4 | Example 3.5 |
|---|---|---|
| water | 489.3 g | 488.4 g |
| anionic polymeric dispersing agent | 40.0 g | 40.0 g |
| 3-aminopropyl trimethoxysilane | 2.8 g | — |
| N-(n-butyl)-3-aminopropyl trimethoxysilane | — | 3.7 g |
| silica particles | 62.0 g | 62.0 g |
| defoamer | 1.0 g | 1.0 g |
| polymer particles | 385.0 g | 385.0 g |
| wetting agent | 20.0 g | 20.0 g |
| pH | 8.8 | 9.0 |
| weight % solids | 24.5 | 24.5 |
| viscosity (Pa-s) | 0.400/0.315 | 0.033 | anionic polymeric dispersing agent: Tamol ™ 731 polymer
defoamer: Surfynol ™ 104BC defoamer
silica particles: Acematt ™ TS-100 silica
polymer particles: Primal U-61 polyurethane polymer particle dispersion
wetting agent: Tergitol ™ 15-S-5 wetting agent The results in Table 3.1 show that the aqueous silica dispersions prepared with the various aminosilane compounds and the anionic polymeric dispersing agent had viscosities of less than 0.5 Pa-s. Example 3.4 showed a decrease in viscosity from 0.400 Pa-s to 0.315 Pa-s as a result of stirring by the viscometer spindle.

What is claimed is:

1. A process for preparing an aqueous silica dispersion comprising silica particles dispersed in an aqueous medium, comprising the steps of:
   providing said aqueous medium;
   admixing anionic polymeric dispersing agent and aminosilane compound into said aqueous medium;
   admixing polymer particles into said aqueous medium;
   admixing said silica particles into said aqueous medium containing said anionic polymeric dispersing agent and said aminosilane compound; and
   reacting or allowing to react said aminosilane compound with said silica particles to provide said aqueous silica dispersion.

2. The process according to claim 1 wherein the admixing polymer particles comprises at least one of:
   adding said polymer particles to said aqueous silica dispersion during mixing or dispersion of said silica particles; and
   mixing an aqueous polymer particles dispersion with said aqueous silica dispersion.

3. The process according to claim 1 wherein said polymer particles are selected from the group consisting of polyurethane polymer particles, acrylic polymer particles, and mixtures thereof.

4. A process for preparing an aqueous silica dispersion comprising silica particles dispersed in an aqueous medium, comprising:
   providing said aqueous medium and said silica particles having an average diameter in the range of from 1 to 10 microns;
   admixing anionic polymeric dispersing agent and aminosilane compound into said aqueous medium;
   admixing said silica particles into said aqueous medium containing said anionic polymeric dispersing agent and said aminosilane compound; and
   reacting or allowing to react said aminosilane compound with said silica particles to provide said aqueous silica dispersion.

5. The process according to claim 4 wherein said aqueous silica dispersion comprises:
   a) from 1 to 30 weight % said silica particles, based on weight of said aqueous silica dispersion;
   b) from 0.01 to 10 weight % said aminosilane compound, based on weight of said silica particles; and
   c) from 5 to 25 weight % said anionic polymeric dispersing agent, based on weight of said silica particles.

* * * * *